Aug. 27, 1968    G. R. RABONE    3,398,896
SUPERSONIC CONVERGENT-DIVERGENT JET EXHAUST NOZZLES
Filed Dec. 30, 1965
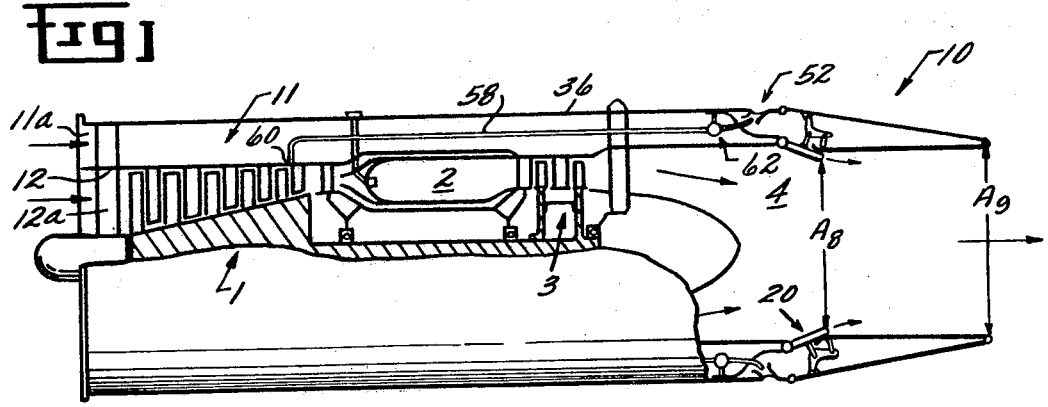
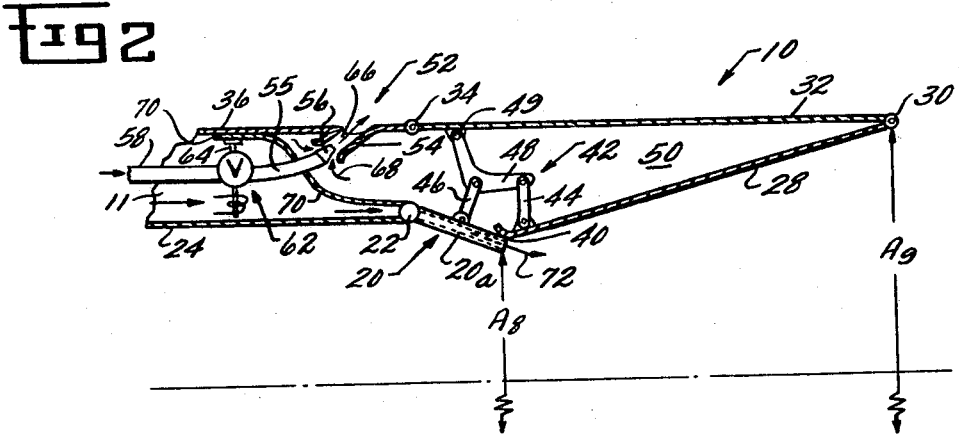
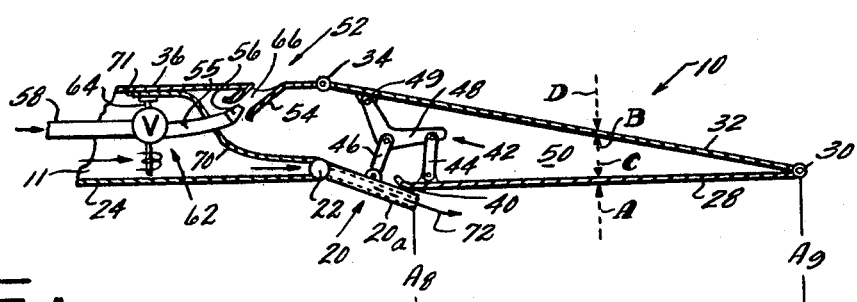
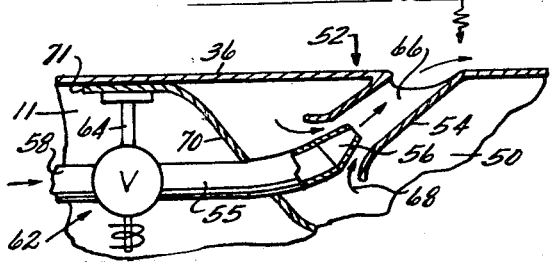
INVENTOR.
GEORGE R. RABONE
BY
Harry C. Burgess
ATTORNEY

United States Patent Office 3,398,896
Patented Aug. 27, 1968

3,398,896
SUPERSONIC CONVERGENT-DIVERGENT JET EXHAUST NOZZLES
George R. Rabone, Cincinnati, Ohio, assignor, by mesne assignments, to the United States of America as represented by the Secretary of the Air Force
Filed Dec. 30, 1965, Ser. No. 517,543
5 Claims. (Cl. 239—265.41)

ABSTRACT OF THE DISCLOSURE

The invention comprises a jet engine exhaust nozzle of the convergent-divergent type, including a plurality of circumferentially-arranged inner wall members 28 and a plurality of circumferentially-arranged outer wall members 32 pivotally supported at their upstream ends and pivotally hinged together at their downstream ends for variation of the nozzle expansion ratio ($A_9/A_8$). Means are provided whereby the annular cavity 50 formed between the inner and outer wall members or flaps is closed off from high pressure secondary air which is instead injected along the inner secondary nozzle wall member as a film coolant. The cavity is maintained at the desired pressure by jet ejector pumps 52 operated by suitable means within the engine, e.g. compressor bleed. The pumps may shut off when the nozzle is not required to stay in the closed or inner position. In this manner, the nozzle secondary or divergent portion will be essentially free floating or self-actuated and will move toward the position of optimum operating performance.

---

The present invention relates to improvements in jet exhaust nozzles of the convergent-divergent type for use in supersonic aircraft and, more particularly, to such a nozzle having means for varying the nozzle expansion ratio without the need for actuator forces to cause movement of the divergent or secondary nozzle sections for achieving said expansion ratio variation.

Convergent-divergent exhaust nozzles, such as are currently used in jet engines for supersonic aircraft, essentially comprise a convergent passage which serves to accelerate the exhaust gas to sonic velocity, followed by a divergent passage which expands the exhaust gas to supersonic velocity. Typically, the convergent and divergent sections of the exhaust nozzle each consist of a plurality of movable wall members against which the exhaust gas stream exerts force to increase the effective thrust or operating efficiency of the engine. To expand the exhaust gas efficiently, the nozzle exit area or outlet of the divergent section (symbolized $A_9$) must bear a definite relation to the nozzle throat area of the convergent section (symbolized $A_8$). This type of nozzle, known as the fully variable "convergent-divergent" nozzle, can provide a maximum amount of useful thrust from the complete expansion of the working fluid in the nozzle. One way to assure complete expansion is to vary the degree of divergence in the divergent portion of the nozzle, i.e., adjust the "expansion ratio" of the nozzle. The expansion ratio is defined as the ratio $A_9/A_8$, i.e., the ratio of the exit area to the throat area. An example of a convergent-divergent nozzle having an adjustable expansion ratio may be found in U.S. Patent No. 3,214,905, entitled "Variable Area Convergent-Divergent Nozzle." In practice it has been found desirable, for optimum efficiency and maximum thrust over a wide operating range, that the nozzle also incorporates means to vary the cross-sectional area of the nozzle throat, generally in accordance with the engine power setting. Such nozzles therefore may incorporate separate sets of flaps or movable wall means for both the secondary and primary sections to vary the exit area, as well as the throat area. Heretofore means have been required for actuation of these flaps or members to achieve the desired area variations for a given mission requirement, which will include take-off, subsonic loiter and supersonic cruise operation of the air vehicle. A supersonic convergent-divergent jet exhaust nozzle which is designed primarily for operation at high flight speeds will have relatively poor low speed, off-design performance from an efficiency standpoint unless the nozzle area ratio can be significantly reduced. To this end it is known to provide the fully variable convergent-divergent type nozzle having the aforesaid adjustable primary and secondary flaps. However, relatively large forces are required in order to hold the secondary nozzle flaps or movable members, in particular, in the closed or inward position during off-design operation at relatively low flight speeds. That is, under these circumstances the relative differential pressures on the respective movable wall members of the divergent section tend to move the members in an outward direction which will result in a greater exit area and thus an undesirable change in the nozzle expansion ratio. Relatively complex, heavy and expensive hydraulic or other mechanical actuator mechanisms are usually provided in order to supply the required large actuation forces. It would be of considerable benefit from both a weight and increased reliability standpoint if such actuators were not required and could be eliminated or possibly replaced with a simple pneumatic or spring system, largely for use in overcoming friction. Heretofore, attempts to eliminate these mechanisms however, have resulted in designs which have had poor supersonic cruise performance at best. An example of such an arrangement is a nozzle wherein a plurality of smaller flaps or doors located upstream of the normal nozzle divergent flaps may be provided, which smaller flaps or doors will automatically open or close depending upon differential fluid pressure. These arrangements usually require that large radial and axial gaps exist under supersonic cruise conditions. Thus, with a change in operating regime, sudden expansion of primary exhaust fluid gases into the cavity created by these gaps causes unacceptable losses under supersonic cruise design conditions. It has also been found that in the conventional convergent-divergent variable exhaust nozzle, a significant factor contributing to the required secondary nozzle actuator force is the secondary air pressure in the cavity formed between the inner and outer wall portions of the secondary nozzle. Thus, it would be desirable to control the pressure in this cavity.

It is therefore a primary object of the invention to provide an improved fully variable convergent-divergent jet exhaust nozzle for use in a supersonic aircraft having no requirement for large actuator forces for moving the secondary variable wall members thereof.

More specifically, it is an object of this invention to provide a convergent-divergent fully variable area supersonic nozzle wherein the nozzle is essentially pneumatically self-actuating, thus eliminating the need for relatively heavy, complex and expensive hydraulic or other mechanical actuator mechanisms for variation of the wall members of the secondary portion of the nozzle.

Briefly stated, the invention is directed to a jet engine exhaust nozzle of the convergent-divergent type, wherein at least the secondary or divergent portion includes a plurality of circumferentially-arranged inner wall members and a plurality of circumferentially-arranged outer wall members pivotally supported at their upstream ends and pivotally hinged together at their downstream ends for variation of the nozzle expansion ratio ($A_9/A_8$). The invention, as disclosed, is specifically directed to the improvements whereby the desired position of the inner and outer divergent wall members is achieved by the wall members being arranged to act as the nozzle's own pneumatic actuation system. Thus, means are provided whereby the annular cavity formed between the inner and outer wall members or flaps is closed off from high pressure secondary air which is instead injected along the inner secondary nozzle wall member as a film coolant. The cavity is maintained at the desired pressure by jet ejector pumps operated by suitable means within the engine, e.g., compressor bleed. Thus, the pumps may be shut off when the nozzle is not required to stay in the closed or inner position. In this manner, the nozzle secondary or divergent portion will be essentially free floating or self-actuated and will move toward the position of optimum operating performance.

While the specification concludes with claims particularly pointing out and distinctly claiming the subject matter which I regard as my invention, it is believed that the invention and further advantages and objects thereof may be better understood from the following detailed description taken in connection with the accompanying drawings in which:

FIG. 1 is a diagrammatic cross-sectional view of a typical turbojet engine utilizing the exhaust nozzle actuation force reduction mechanism of the invention;

FIG. 2 is an enlarged partial diagrammatic view of the jet engine exhaust nozzle of FIG. 1 with the nozzle flaps shown in the open position for supersonic cruise operation;

FIG. 3 is a view similar to FIG. 2 showing the exhaust nozzle thereof in position for subsonic or low flight speed operation;

FIG. 4 is an enlarged fragmentary view of one of the ejector pumps.

Turning now specifically to the drawings, FIG. 1 is a cross-sectional view of a typical jet engine of the turbojet variety. For example, there is a rotating axial-flow compressor 1, combustion means 2 for heating and increasing the velocity of the compressed air received from the compressor, and power turbine means 3. The power turbine expands the hot gases from the combustion section into the tailpipe area 4 from whence the gases are exhausted to the atmosphere. A part of the power output of the turbine is, of course, used to drive the compressor through a shaft connecting the two rotating components. The available energy in the exhaust gas stream of the turbojet engine is converted to kinetic energy or thrust of the jet. It is necessary for optimum operating efficiency to take advantage of all the thrust or reaction force available in the exhaust gas stream. In the case of supersonic aircraft, in particular, it is necessary to do this over a wide range of operating conditions and exhaust nozzle pressure ratios. To provide this optimum wide range operating capability, the turbojet illustrated in FIG. 1 is provided with the improved convergent-divergent exhaust nozzle of my invention indicated generally at 10. While for ease of illustration a conventional turbojet gas turbine engine has been described, it should be understood that the invention incorporated in the nozzle will be equally useful to the operation of a turbofan type of gas turbine wherein a fan or low pressure compressor (not shown) is provided in the auxiliary duct indicated at 11 coaxially arranged around the primary duct 12 containing the basic gas generator described hereinabove. In the gas turbine cycle arrangement depicted in FIG. 1, the primary air stream enters inlet area 12a and goes through the axial-flow compressor 1 to be heated in and expanded in a manner described while, at the same time, the secondary air stream enters inlet 11a, passing through the secondary passage 11. The secondary air is useful in cooling hot parts of the exhaust nozzle, as hereinafter described.

As shown in the drawings, the throat or convergent portion of the nozzle is designated by the plane $A_8$, while the exit area is designated by the plane $A_9$. While not absolutely essential to the operation of the engine, for improved efficiency the convergent portion of the nozzle comprises a plurality of movable flaps or fingers, one of which is indicated at 20 in FIG. 2. The throat area $A_8$ is thus formed by the series of circumferentially arranged primary flaps which in the disclosed embodiment are pivotally attached at 22 to a tailpipe duct 24. The divergent or secondary portion of the convergent-divergent nozzle 10 is likewise formed by one or more series of circumferentially arranged flaps or fingers. Thus, there are a plurality of inner divergent flaps, one of which is indicated at 28, pivotally supported at their downstream ends by hinge means 30 attached to outer support members or flaps, one of which is indicated at 32. The outer divergent flaps or fingers 32 are in turn pivotally supported at 34 at the downstream end of the engine outer casing or nacelle 36. It will therefore be realized that the divergent or secondary portion of the nozzle comprises circumferentially and coaxially arranged pluralities of inner flaps 28 and outer flaps or support members 32 pivotally secured to supporting structure in the engine. A slight annular clearance 40 may be provided between the downstream ends of the primary flaps 20 and the upstream ends of the inner divergent or secondary flaps 28. Means for controlling movement of the flaps to prevent interference therebetween may be provided in the form of a suitable linkage mechanism, indicated generally at 42. The linkage mechanism may comprise link bars 44 and 46 pivotally attached to the secondary and primary flaps, respectively. The links, in turn, are pivotally attached to a bellcrank 48. The bellcrank is itself pivotally supported at 49 from the secondary flaps 32. The linkage system will prevent interference between the primary and secondary flaps or wall members as they are varied.

As stated above, in a convergent-divergent variable area nozzle one of the most significant factors affecting the requirement for secondary actuator forces is the secondary air pressure in the cavity 50 formed between the inner and outer divergent variable area wall members 28 and 32, respectively. In accordance with the present invention, I have provided means to close the cavity 50 off from high pressure air during relatively low speed, off-design operating conditions. This, as stated, is to eliminate means in the form of complex hydraulic or other mechanical actuators to hold the nozzle closed at low flight speeds since high pressure air acting on the surfaces of flaps 32 would tend to cause the nozzle to open. To this end, there is provided a jet ejector pump indicated generally at 52. The pump comprises an aspirating tube arrangement consisting of a wall 54 closely surrounding a pressurized fluid conduit 55 having a nozzle 56. The jet ejector pump 52, or pumps, may be operated by any suitable means. In the embodiment shown in FIG. 1 there is provided a compressor bleed line 58 which connects to the pump 52 and runs forwardly to the axial flow compressor 1 where it is connected thereto at 60. The axial flow compressor bleed air passes through the passage 58 to a solenoid operated control valve, indicated generally at 62. Suitable support means 64 are provided for valve 62. When operating pump 52 ejects air from cavity 50 through aspirator passage 66 formed by wall 54 as shown by arrows 68. Means must also be provided for the passage of the secondary cooling air to the nozzle interior. To this end I have provided an air flow baffle or dam member 70 which attaches at 71 to the housing 36 and which may be sealingly affixed to the inner duct 24 at hinge 22. Hinge means 22 may be made hollow, in accordance with known means, so as to permit the secondary air flow indicated by the small arrows 72 in FIG. 2, to be ducted through passages 20a in the hollow flap 20. In this manner the secondary air flow will be ducted along the divergent wall member 28 of the secondary nozzle portion, the air being ejected from a small opening indicated at the downstream end of the primary flaps 20.

In operation, cavity 50 will be essentially closed off to the high pressure secondary air which is ducted through the double wall primary flap 20 and ejected along the inner secondary or divergent member wall 28 as a coolant, particularly during operation requiring the nozzle to be closed, i.e., in the FIG. 3 position. The cavity 50 will be maintained at a relatively low pressure level by means of the compressor bleed operated ejector pump 52. That is, when valve 52 opens to permit compressor bleed air to be ejected from nozzle 56, the aspirating action of passage 66 will draw air out of cavity 50. Some air under pressure will, of course, be present under operating conditions since there must be some slight clearance between the downstream ends of flaps 20 and the upstream ends of flaps 28. In addition to air leaking through passage 40, while adjacent ones of the pluralities of movable wall means 28 and 32 can be joined by a suitable known sliding seal arrangement (not shown), nevertheless due to existing pressure differentials across the flaps 28 and 32 during operation further air is admitted to the cavity 50. When sufficient flight speed has been attained the internal pressure will automatically cause the secondary nozzles to be full open to the desired position for efficient supersonic motive fluid expansion since internal pressure will overcome cavity pressure. In this manner, using the nozzle primary and secondary as essentially its own pneumatic actuator, the use of hydraulic or other mechanical actuation systems may be eliminated.

In other words, in the subsonic operating regime, unless cavity 50 is closed off, the internal nozzle pressure A on the inside surfaces of flaps 28 and the cavity pressure B acting on the inside of flaps 32 (flaps 32 presenting a larger total surface area than flaps 28) would more than offset the pneumatic forces C or D, respectively, acting on the outside surfaces of flaps 28 and 32. But through use of baffle means 70 and pump 52 the relative forces $A-D$ and $B-C$ are essentially as indicated by the dotted arrows in FIG. 3 and the nozzle flaps assume the desired position. The only requirement may be for simple pneumatic or mechanical spring system to overcome friction between the inter-connected circumferentially arranged pluralities of flaps or wall members and their seals.

While a particular embodiment of the means of the present invention has been disclosed, it will be obvious to those skilled in the art that various changes and modifications may be made in such embodiment without departing from the spirit or scope of the invention, and it therefore is intended in the appended claims to cover all such equivalent variations and modifications.

What I claim and desire to secure by Letters Patent is:

1. A variable area convergent-divergent exhaust nozzle for a jet engine including an exhaust duct, a housing spaced about the duct to form a passage therewith, and a source of pressurized air for said passage, said nozzle comprising:
    an outer plurality of longitudinally-extending, circumferentially-arranged movable wall members;
    means for pivotally supporting the upstream ends of said outer plurality of movable wall members on the housing;
    an inner plurality of longitudinally-extending movable wall members, the members of said inner plurality having their downstream ends pivotally interconnected to the respective downstream ends of the members of said outer plurality, said downstream ends jointly defining the nozzle exit area;
    means for pivotally supporting the upstream ends of said inner plurality of movable wall members with respect to the upstream ends of said outer plurality;
    closure means forming an annular cavity in cooperation with said pluralities of movable members, said cavity tapering in a downstream direction to said interconnected ends, said closure means blocking the flow of pressurized air from the passage to said cavity; and
    pump means cooperating with said closure means for regulating the pressure in said cavity to control the pressure differentials across the respective wall members of said outer and inner pluralities, whereby the said movable members pivot to provide a minimum exit area for transonic operation and a maximum exit area for supersonic cruise operation without application of mechanical forces to move said members.

2. The invention according to claim 1 wherein said closure means includes a third plurality of longitudinally-extending, circumferentially-arranged movable wall members, means for pivotally supporting the upstream ends of said third plurality of members from the exhaust duct, the downstream ends thereof being located immediately adjacent the upstream ends of said inner plurality, and baffle means extending between the housing and the support means and being in sealing engagement therewith.

3. The invention according to claim 2 wherein said pump means comprises at least one passage opening said cavity to ambient downstream of said baffle means, said passage having annular wall means extending inwardly of the cavity, a nozzle member introduced into said wall means in an aspirating relationship therewith, and air supply means for said nozzle member for aspiration of said cavity.

4. The invention according to claim 3 wherein said air supply means includes a conduit connected to said nozzle member, said conduit extending through the closure means in a sealing engagement therewith, means for connecting said conduit to the compressor of said engine for supplying air to said nozzle member, and valve means in said conduit, said valve means being selectively operable to open said conduit to aspirate said cavity during transonic engine operation and to close said conduit during supersonic operation of said engine.

5. The invention according to claim 2 wherein each of the movable wall members of said third plurality includes a longitudinal air passage and said support means for said members comprises a series of hollow hinges, said longitudinal air passages being in flow communication with said engine passage through said hollow hinge means for injection of said pressurized air into said nozzle at the downstream ends of said third plurality of wall members for film cooling of said inner plurality of wall members.

References Cited

UNITED STATES PATENTS

| | | | |
|---|---|---|---|
| 2,926,491 | 3/1960 | Hyde | 239—265.41 |
| 3,214,904 | 11/1965 | Bailey et al. | 239—265.41 X |
| 3,214,905 | 11/1965 | Beavers et al. | 239—265.41 X |

M. HENSON WOOD, JR., *Primary Examiner.*

H. NATTER, *Assistant Examiner.*